Dec. 1, 1970  D. R. SESSLER  3,543,582

AGE INDICATING DEVICE

Filed Feb. 10, 1969

INVENTOR
DONALD R. SESSLER
BY
ATTORNEY

United States Patent Office 3,543,582
Patented Dec. 1, 1970

3,543,582
AGE INDICATING DEVICE
Donald R. Sessler, Temple City, Calif., assignor to Dynametric, Inc., Pasadena, Calif., a corporation of California
Filed Feb. 10, 1969, Ser. No. 798,060
Int. Cl. G01k 3/04, 7/24; G01r 11/44
U.S. Cl. 73—339                      11 Claims

ABSTRACT OF THE DISCLOSURE

An age indicator suitable for ascertaining the effect of exposure of articles to varying temperature conditions on the useful life of the article, is provided with means for conveniently resetting the age indicator for reuse. An electrical circuit is provided by which a greater magnitude of current is allowed to flow through the age indicator when operated in the setting, that is, resetting, mode than when the age indicator is being operated in the age indicating mode. The age indicator may be reset by this operation to its zero point or to any desired intermediate position.

CROSS REFERENCES TO RELATED APPLICATIONS

Patent application Ser. No. 740,053 filed June 26, 1968; and patent application Ser. No. 750,810 filed Aug. 7, 1968.

This invention relates to a reusable apparatus for measuring the amount of exposure of various kinds of articles, particularly photographic sheet material, to varying temperature conditions which cause the articles to deteriorate, or age, at different rates depending on the temperature.

It is well known that many kinds of articles, such as unused or undeveloped photographic sheet material, food, and chemicals, deteriorate with age. Furthermore, it is well known that the rate of deterioration varies greatly with temperature. The invention will be described with particular reference to photosensitive sheet material, such as photographic film. Unless otherwise stated, the term photographic film as used herein refers to unused photographic film, that is, film which has not been exposed to light or, if it has been exposed, still remains undeveloped.

Manufacturers often date packages of photographic film to indicate the time before which the film should be used with the expectation that its original photographic properties still remain. Such dating often assumes that the film is stored at normal atmospheric temperature for most of the time and is not subjected to high or low temperature conditions before it is actually used. Such dating is unreliable if the film is exposed to extreme temperature conditions. For this reason, manufacturers often supply data as to the life to be expected if the film is stored at different specific temperatures. The life at a specific temperature, such as 80° F, is sometimes referred to herein as the specified life.

If one maintains records of the temperatures to which the film is exposed and the periods of exposure at different temperatures, he may be able to estimate the residual specified life of the film remaining after such exposure. To say the least, this method of determining the residual specified life of film is rather tedious. Furthermore, it is unsuitable for use where the temperature history of the film is unknown.

One type of age indicator is described in U.S. patent application Ser. No. 740,053 filed by Donald R. Sessler on June 26, 1968. This age indicator utilizes a thermistor, that is, a temperature sensitive resistor, a non-ohmic resistor, a microcoulometer which operates on the principles of Faraday's law, and a battery power source. By utilizing various types and quantities of temperature sensitive resistors and diodes, the effect of almost any temperature range on an article subject to temperature aging may be indicated.

This type of age indicator is particularly useful where the temperature history of an article is unknown and extensive variations in aging rate are anticipated. By way of example, film is often shipped to or through locations with tropical or desert climates. Various kinds of vehicles of transportation are utilized for this purpose and the film is often detained for periods of time on docks or in mobile camera trucks. Such detention results in an exposure of the film to a wide range of temperatures, often including high atmospheric-temperature conditions such as temperatures above 100° F. The difficulty of maintaining an accurate record of such a temperature history without the aid of a simple, compact, rugged age indicating device, such as that described in the above identified patent application Ser. No. 740,053, is recognized at once.

So far as applicant knows, all of the age indicators previously known have a common limitation of being capable of use in the age indicating mode only once before some special treatment, such as shipment back to the manufacturer's factory, is required in order for the age indicator to again be capable of indicating aging. The phrase "age indicating mode," as used herein, means condition for operation of an age indicator to indicate the aging of an article. The phrase "setting mode," as used herein, means the reverse condition for recycling or reversing the operation of the age indicator in order that it may be reused in the age indicating mode. In the "setting mode" the prior history of the age indicator is erased electrically, thereby rejuvenating the age indicator, that is, restoring it to its initial or other condition. In its setting mode the age indicator may be at zero condition or other starting condition before being placed in use.

An age indicator which is easily and quickly reversed so as to be reusable would be useful, for example, where the receiver of a shipment of aging articles wishes to return a shipment of like articles to the sender but where the receiver does not have an unused age indicator available. Also, shippers of aging articles would be saved the time and expense of returning their age indicators to the manufacturer's factory for rejuvenation.

Therefore, it is desirable to provide an age indicating device, the operation of which may be conveniently and economically reversed for a desired period so that the age indicating device may be reused in the age indicating mode.

One object of this invention is to provide an age indicator which has two modes, one an "age indicating mode" in which it operates to cumulate an effect for indicating the aging of an article and the other a "setting mode" in which it can be operated by a battery or other power source to set the indicator in a zero or other starting condition.

Another object of this invention is to provide a simple, economical, compact, easily operable device which, after producing an indication that represents the cumulative effect of exposure of an article to widely different temperature conditions, may be rejuvenated in order to again produce such an indication.

Another object of this invention is to provide a simple, economical, compact, easily operable device which, after operating in the age indicating mode to produce an indication that represents the cumulative effect of exposure of an article to widely different temperature conditions, may be operated in the setting mode in order that such a device may again be prepared for operation in the age indicating mode.

Another object of this invention is to provide a reusable device which, after indicating the aging effects of temperature upon an article, may be set for reuse by passing 3,543,582 a current through a relatively low resistance circuit.

Another object of this invention is to provide a reusable age indicating device of such construction that the components thereof will be protected during its operation while at the same time providing a simple, convenient means for observing the indication and for reversing the operation of the age indicating device.

In this invention, an age indicator suitable for detecting the aging rate of an article at various temperatures is provided with means for conveniently resetting the age indicator for reuse in the age indicating mode. Such an age indicating device is thus capable of being reused many times in both the age indicating mode and in the setting mode. The reusable age indicating device of this invention may be reset before the full extent of its operation in the age indicating mode is reached and may be operated in the setting mode for the desired period of time to reset the age indicator at any desired point.

The foregoing and other advantages, features, and characteristics of this invention are described below in connection with the following drawings wherein.

In the age indicator of this invention, an electrical circuit is provided by which a larger current is allowed to flow through the charge integrator when the age indicator is being operated in the setting, or resetting, mode than when the age indicator is being operated in the age indicating mode. The charge integrator may thus be quickly reset to its zero point or to any desired intermediate position at any time. Such speed is important since the charge integrator may take months or even years to reach a full scale reading when operated in its age indicating mode. With this invention, the age indicator may be reset in a matter of minutes or hours.

In this invention, a rectifier is connected in the circuit in such a way that a large current flows through the charge integrator while bypassing other elements of the circuit when the age indicator is operating in the setting mode. The age indicator also usually employs another diode as a non-ohmic resistor, together with a thermistor, for establishing the manner in which the current varies with temperature when the indicator is operating in the age indicating mode. In the latter mode, very little current flows through the aforementioned rectifier.

In the best embodiment of this invention, the rectifier is in the form of a diode which is of the semi-conductive type. When the current flows in one direction through a diode the resistance of the diode is relatively low. This is referred to as the "forward" direction. When the current flows in the other direction the resistance is very high. This is referred to as the "reverse" direction. As the term is used herein, when a diode is said to be "reversely connected," the current flows in the "reverse" direction through the diode while the age indicator is operated in the age indicating mode.

Figure 1:
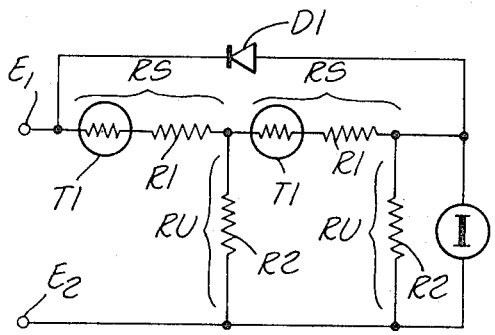
FIG. 1 is a schematic diagram of an electrical circuit embodying this invention.

In the embodiment of the invention illustrated in FIG. 1, an age indicator is employed which utilizes a ladder network comprising a number of series circuits RS and a series of shunt circuits. The series circuits RS are connected in series with a charge integrator I across current input terminals E1 and E2. The shunt circuits RU are connected at one end to junctions between successive series circuits and at the other end to one of the terminals in parallel with the charge integrator. Each series circuit RS includes a thermistor T1 and a fixed series resistor R1. The shunt circuits include only a fixed shunt resistor R2.

A reversely connected diode D1 is connected across the series circuits RS, that is, between the charge integrator I and the current input terminal E1. The resistance of the series circuits is large compared with the forward resistance of the diode and small compared with the reverse resistance of the diode.

The terminals E1 and E2 are intended to be connected respectively to the + and — terminals of a battery when the age indicator is in the age indicating mode. When the battery is reversed, the device is in the setting mode.

When operated in the age indicating mode, that is, with current flowing from terminal E1 through the circuit to terminal E2, the elements are so selected that as the temperature rises, the voltage across shunt circuits RU increases. The values of the circuit elements are so chosen that at each temperature the current is proportional to the aging rate of the object with which it is to be employed. Other combinations of thermistors and fixed resistors may be utilized in the circuit illustrated in FIG. 1 in order to vary the temperature sensitive characteristics of the circuit.

When the age indicator is operated in the age indicating mode, that is, when current flows from terminal E1 through the circuit to terminal E2, the diode D1, being reversely connected, permits only a relatively small current to pass through it. However, when the age indicator is operated in the setting mode, that is, when current flows from input terminal E2 through the circuit to input terminal E1, the diode D1 permits a relatively large current to flow through it. When the age indicator is in the setting mode, the electrical path through the charge integrator I and the diode D1 is of relatively low resistance when compared with the alternate paths through which the current might flow. But when the age indicator is in the age indicating mode, the resistance of that electrical path is relatively high compared with that of the alternate paths.

The reversely connected diode D1 thus enables a larger current to flow through the charge integrator I when the age indicator is operating in the setting mode than when the diode D1 is absent. Such an age indicator enables its user to reset the charge integrator I for reuse to any desired point with much greater facility and in less time than if diode D1 were absent.

Figure 2:
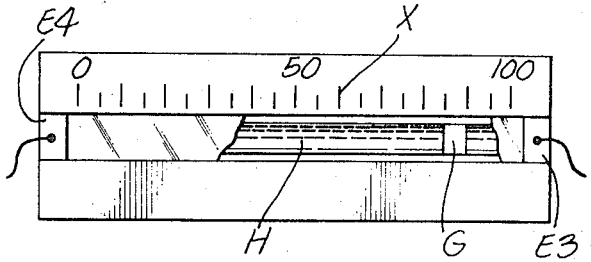
FIG. 2 is a diagram representing a charge integrator of the type employable in this invention.

The charge integrator I may be of any one of a number of types of devices well known to those skilled in the art. Microcoulometers, however, have been found to be best suited for use in this type of reusable age indicator. The best type of microcoulometer now known is in the form of an electrochemical cell which operates in accordance with Faraday's law and which has come to be commonly known as a Curtis meter. Microcoulometers of this type are illustrated in FIG. 2 and described, for example, in Beusman Pat. No. 3,343,083 and John Pat. No. 3,344,343.

As indicated in FIG. 2, such a Curtis meter comprises essentially a capillary tube having two electrical terminals E3 and E4 at opposite ends of a bore H, with a body of liquid mercury (Hg) nearly filling the bore H in the space between the terminals. The unoccupied portion forms the gap G which is filled with an electrolyte such as a water solution of a mercury salt, such as mercury iodide.

As is well known, when electrical current flows through such a cell from one terminal to the other, mercury atoms are transported across the liquid gap G causing the gap G to move from one end of the cell to the other. When current flows from terminal E3 through the Curtis meter to terminal E4, atoms of mercury are transported in the same direction thereby moving the gap G from the end at terminal E4 to the end of adjacent terminal E3.

Various other types of charge integrators, operating on the principle of Faraday's law and well known in the art, may be employed in this invention. For example, another type of charge integrator I which might be employed in this invention is a magnetic core cell of the type described in Alexander Pat. No. 3,268,803.

Figure 3:
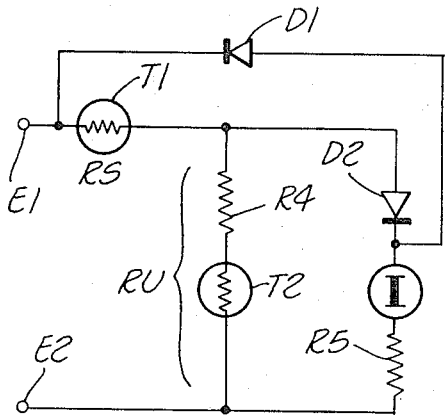
FIG. 3 is a schematic diagram of another electrical circuit embodying this invention.

In the embodiment of the invention illustrated in FIG. 3, a series circuit RS is connected across current input terminals E1 and E2 in series with a diode D2 that serves as a non-ohmic resistor and a charge integrator I and a fixed resistor R5. In this embodiment of the invention, a shunt circuit RU is conected in parallel with a series circuit that includes the diode D2 and the charge integrator I and fixed resistor R5. The series circuit RS includes a first thermistor T1. The shunt circuit RU includes a second thermistor T2 and a fixed resistor R4. A reversely connected diode D1 is connected across the series circuit RS and the diode D2. Stated differently, one end of the diode D1 is connected to the junction between diode D2 and the charge integrator I and the other end of the diode is connected to the current input terminal E1. The combined series resistance of the series circuit RS and diode D2 is large compared with the forward resistance of the diode D1 and small compared with the reverse resistance of the diode D1.

The elements are so selected that as the temperature rises the voltage across the shunt circuit RU increases when the circuit is employed in the age indicating made.

A typical list of elements for an age indicator for the type illustrated in FIG. 3 is as follows:

T1—8,000 ohms
T2—500 ohms
R4—1,500 ohms
R5—1,000 ohms
D1—Model IN 4,009
D2—Model IN 4,009

When the age indicator is operated in the setting mode, most of the current flows through the low resistance path formed by fixed resistor R5, current integrator I and reversely connected diode D1. This relatively low resistance path enables the current integrator I to be reset to a desired point with much less time than if the diode D1 were absent and the battery were merely reversed.

In order to utilize this invention to its fullest extent some convenient means of changing the polarity of the current input at the terminals E1 and E2 is necessary. Various means well known in the art are suitable for accomplishing such a reversal of polarity.

Figure 4:
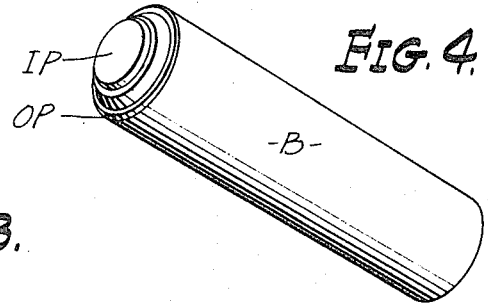
FIG. 4 is a perspective view of a battery employed in one form of the invention.

In the best embodiment of this invention, two different batteries are employed as current input sources. Both batteries are similarly constructed to have at one end an inner and an outer electrical contact ring which are oppositely polarized as shown in FIG. 4. One such battery B which has been utilized is a mercury battery which has its inner pole IP negatively polarized and its outer pole OP positively polarized. The other battery of the opposite configuration may be a common dry cell battery. The inner pole IP may be in the form of a button or stub while the outer pole OP is in the form of a ring. The current input terminals E1 and E2 are positioned so that they will both contact the same end of the battery but oppositely polarized electrical contacts. Thus, when the two batteries are alternately placed in contact with the current input terminals E1 and E2 of the age indicating device of this invention, the polarity of the terminals E1 and E2 will be reversed and opposite modes of operation of the age indicator will result, one mode being the age indicating mode and the other being the setting mode. The manner of operation of one such battery in conjunction with a preferred embodiment of this invention is illustrated in FIG. 5.

In order to protect the age indicator from physical damage while at the same time facilitating its use, it is desirable to insert the age indicator into a small cylindrical tube.

Figure 5:
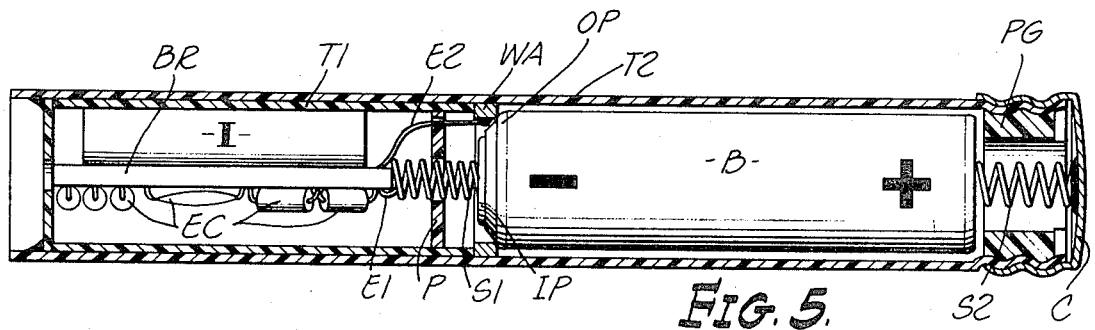
FIG. 5 is a partly sectional side view of one form of this invention.

In one embodiment of this invention illustrated in FIG. 5, a small cylindrical tube T1 is employed which is open at one end. A mounting board BR, adapted to carry a charge integrator I on one side and electrical components EC on the other side, is mounted within the tube T1. The tube T1 is mounted within a second cylindrical tube T2, which is open at one end. The tube T1 is mounted adjacent to the closed end of the tube T2 with the terminals E1 and E2 projecting toward the other end of tube T2. Helical spring S1 is soldered to terminal E1 and is adapted to electrically contact battery B and to urge the battery B against the spring S2. The terminal E2 and the spring S1 project through and are supported by the transverse wall or partition P which is an integral part of one end of tube T1. The terminal E2 is soldered to metal washer WA which is in turn mounted on the end of tube T1 and inside of tube T2. The current source B, typically a battery, is suitably mounted inside of tube T2 so that its poles OP and IP may contact washer WA and spring S1 respectively.

The open end of tube T2 is adapted to threadedly engage the threaded plug PG. The plug PG has a central opening of smaller diameter than the diameter of battery B but larger than the diameter of helical spring S2. Spring S2 is attached to the inside of closure member or cap C. Cap C is threaded and is adapted to be screwed onto the open end of the tube T2 in order to enclose the age indicator inside of the tube T2. The cap C is further adapted to resiliently urge the battery B in to electrical contact with the current input terminals E1 and E2 by means of spring S2 urging battery B against the spring S1 and metal washer WA. In the form of the device illustrated in FIG. 5, the helical spring S2 mounted within cap C serves to hold the poles IP and OP of battery B in contact with the washer WA and the spring S1. When cap C is removed the spring S1 pushes the pole OP of battery B out of contact with washer WA thus serving to break the electrical circuit.

The tubes T1 and T2 may be constructed of an electrically conductive or non-conductive material, depending on the type of current reversing means to be employed. However, the tubes T1 and T2 should be thermally conductive in order to transmit atmospheric-temperature conditions to the age indicator enclosed within the tubes T1 and T2. The tubes T1 and T2 may also be constructed of either transparent or opaque material. If the material is opaque, the tubes may be provided with windows in order that the indications of the charge integrator I may be observed.

Figure 6:
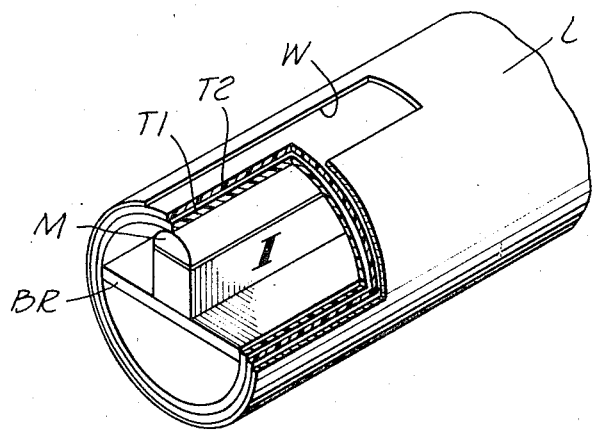
FIG. 6 is a partly sectional view of one form of the invention.

In the embodiment of the invention illustrated in FIG. 6, a label L with an aperture or window W is secured to the outside of tube T2 and a magnifying lens M is secured to the top of charge integrator I inside of tubes T1 and T2 in order that indications of the charge integrator I may be more easily and conveniently read.

In operation, the battery B is inserted into the tube T2 and the closure member C is placed over the open end of the tube T2. The age indicator will then operate in either the age indicating mode or in the setting mode, depending upon the manner in which the current input terminals E1 and E2 electrically contact the battery B. In order to reverse the operation of the age indicator, the cap C is removed and a battery with the polarity of its inner pole IP and outer pole OP reversed, such as has been mentioned above, is inserted. When the closure member C is replaced to again hold the battery B in electrical contact with the current input terminals E1 and E2, the age indicator will operate in a mode opposite from its former operation.

It is thus seen that an age indicator is provided which may be conveniently connected in either the age indicating mode or in the setting mode, and that during such operation the age indicator is protected from physical damage while at the same time enabling the user to observe the indication of the charge integrator I.

Other types of charge integrators and rectifiers may be employed in this invention. Other types of current reversing means may also be employed.

It is therefore to be understood that the invention is not limited to the specific devices disclosed, but may be embodied in many other forms within the scope of the appended claims.

The invention claimed is:

1. An age indicator comprising a thermistor, a non-ohmic resistor, a rectifier, and a charge integrator electrically connected together in a circuit across a pair of current input terminals, the thermistor, the non-ohmic resistor, and the charge integrator being connected in series and the rectifier being connected to the junction between the non-ohmic resistor and the charge integrator and across the thermistor and the non-ohmic resistor, whereby a larger current flows through the charge integrator when a voltage is applied with one polarity across the current input terminals than when the voltage is applied with the opposite polarity across the current input terminals.

2. An age indicator as defined in claim 1 wherein the charge integrator is an electrochemical microcoulometer.

3. An age indicator comprising a temperature sensitive resistor network, a charge integrator and a rectifier electrically connected together in a circuit across a pair of current input terminals whereby the current flows largely through the charge integrator and the rectifier bypassing the temperature sensitive resistor network when a power source is applied at the current input terminals in one direction and large through the temperature sensitive resistor network and the charge integrator bypassing the rectifier when the power source is applied at the current input terminals in the opposite direction.

4. An age indicator as defined in claim 3 wherein a diode is connected in series with the charge integrator.

5. An age indicator as defined in claim 3 wherein the rectifier is a semiconductive diode.

6. An age indicator comprising a thermistor and a resistor connected in series in an electrical circuit across a pair of current input terminals, and a charge integrator and a diode connected to the junction between the thermistor and the resistor, the charge integrator being connected across the resistor to one input terminal and the diode being connected across the thermistor to the other input terminal, whereby the current flows largely through the circuit bypassing the diode when a power source is applied at the current input terminals in one direction and largely through the circuit bypassing the thermistor and resistor when the power source is applied at the current input terminals in the opposite direction.

7. An age indicator comprising a thermistor and a resistor connected in series in an electrical circuit across a pair of current input terminals, a first diode and a charge integrator connected in series across the resistor, the first diode being connected to the junction between the thermistor and the resistor and the charge integrator being connected to the same input terminal as the resistor, and a second diode connected across the thermistor and said first diode, one terminal of said second diode being connected to the junction between said first diode and the charge integrator and the other terminal of said second diode being connected to the same input terminal as the thermistor, whereby the current flows largely through the circuit bypassing the thermistor, the resistor and said first diode when a power source is applied to the current input terminals in one direction and largely through the circuit bypassing said second diode when a power source is applied to the current input terminals in the opposite direction.

8. An age indicator comprising a first diode and a charge integrator connected in series in an electrical circuit across a pair of input terminals, means for varying the current through the circuit as a function of temperature, and a second diode connected across said first diode, one terminal of said second diode being connected to the junction between said first diode and the charge integrator and the other terminal of said second diode being connected to the same input terminal as said first diode, whereby the current flows largely through the circuit bypassing said first diode when a power source is applied to the current input terminals in one direction and largely through the circuit bypassing said second diode when the power source is applied to the current input terminals in the opposite direction.

9. An age indicator comprising a hollow tubular member and electrical components, wherein the hollow tubular member is provided with an aperture in its surface for observing changes in a charge integrator and with a closure member for sealing said tubular member, the electrical components comprising a thermistor, a resistor, a diode, and a charge integrator connected together in an electrical circuit inside of said tubular member so that the charge integrator will indicate the flow of current through the circuit when a power source is connected into said circuit, the charge integrator being mounted behind the aperture so that said indications of the charge integrator may be visually observed through the aperture in the hollow tubular member, said thermistor and said resistor being connected in series across a pair of input terminals, and said charge integrator and said diode being connected to the junction between the thermistor and the resistor, the charge integrator being connected across the resistor to one input terminal and the diode being connected across the thermistor to the other input terminal, whereby the current flows largely through the circuit bypassing the diode when the power source is applied at the current input terminal in one direction and largely through the circuit bypassing the thermistor and the resistor when the power source is applied at the current input terminals in the opposite direction.

10. An age indicator as defined in claim 9 wherein said hollow tubular member further comprises:

a tube closed at one end and having an aperture in its wall for observing a charge integrator inside of the tube;

partition means secured transversely across the inside of the tube and adapted to hold electrical contacts;

a closure member for sealing the open end of the tube; and means attached to the inside of the closure member for resiliently urging a battery into contact with the electrical contacts.

11. An age indicator as defined in claim 10 wherein the open end of the tube and the closure member are threaded.

References Cited

UNITED STATES PATENTS

| | | | |
|---|---|---|---|
| 2,753,714 | 7/1956 | Perkins et al. | 73—363(R) |
| 2,967,428 | 1/1961 | Burgert | 73—362(R)X |
| 3,102,425 | 9/1963 | Westman et al. | 73—362 |
| 3,330,158 | 7/1967 | Simonyan et al. | 73—362(R) |
| 3,343,083 | 9/1967 | Beusman | 324—94 |
| 3,405,274 | 10/1968 | Lakin | 324—94 X |

LOUIS R. PRINCE, Primary Examiner

F. SHOON, Assistant Examiner

U.S. Cl. X.R.

73—362; 324—94